(12) United States Patent
Beeck et al.

(10) Patent No.: US 8,092,175 B2
(45) Date of Patent: Jan. 10, 2012

(54) TURBINE BLADE

(75) Inventors: Alexander R. Beeck, Orlando, FL (US); Stefan Hoffmann, Rosenthal (DE)

(73) Assignee: Siemens Aktiengesellschaft, Munich (DE)

( * ) Notice: Subject to any disclaimer, the term of this patent is extended or adjusted under 35 U.S.C. 154(b) by 659 days.

(21) Appl. No.: 12/226,537

(22) PCT Filed: Feb. 13, 2007

(86) PCT No.: PCT/EP2007/051403
§ 371 (c)(1),
(2), (4) Date: Oct. 21, 2008

(87) PCT Pub. No.: WO2007/122022
PCT Pub. Date: Nov. 1, 2007

(65) Prior Publication Data
US 2009/0185903 A1    Jul. 23, 2009

(30) Foreign Application Priority Data
Apr. 21, 2006  (EP) .................................. 06008319

(51) Int. Cl.
*F01D 5/08* (2006.01)
*F04D 29/58* (2006.01)

(52) U.S. Cl. ..................................... 416/95; 416/223 R (58) Field of Classification Search .................... None
See application file for complete search history.

(56) References Cited

U.S. PATENT DOCUMENTS

| 3,191,908 | A | * | 6/1965 | Petrie et al. ................. 416/96 R |
| 3,527,543 | A | | 9/1970 | Howald |
| 3,574,481 | A | * | 4/1971 | Pyne et al. .................. 416/90 R |
| 3,806,274 | A | * | 4/1974 | Moore ......................... 416/97 R |
| 3,934,322 | A | * | 1/1976 | Hauser et al. ............. 29/889.721 |
| 4,080,095 | A | * | 3/1978 | Stahl ............................. 415/178 |
| 4,297,077 | A | * | 10/1981 | Durgin et al. ............... 416/97 R |
| 4,684,322 | A | * | 8/1987 | Clifford et al. ................. 416/95 |
| 5,690,472 | A | * | 11/1997 | Lee .............................. 416/97 R |
| 6,305,904 | B1 | * | 10/2001 | Weigand et al. ............. 416/97 R |
| 6,551,063 | B1 | | 4/2003 | Lee et al. |
| 7,296,973 | B2 | * | 11/2007 | Lee et al. ..................... 416/97 R |
| 7,563,072 | B1 | * | 7/2009 | Liang ......................... 416/96 A |
| 7,572,103 | B2 | * | 8/2009 | Walters et al. .............. 416/96 R |
| 7,731,481 | B2 | * | 6/2010 | Cunha et al. ................ 416/97 R |
| 7,753,650 | B1 | * | 7/2010 | Liang .......................... 416/97 R |

FOREIGN PATENT DOCUMENTS

| EP | 0 896 127 A2 | 2/1999 |
| EP | 1 467 065 A2 | 10/2004 |
| EP | 1 580 399 A1 | 9/2005 |
| WO | WO 99/46540 A1 | 9/1999 |
| WO | WO 2005/003517 A1 | 1/2005 |

* cited by examiner

*Primary Examiner* — Scott B Geyer (57) ABSTRACT

The invention relates to a turbine blade comprising a profiled vane around which working gas flows. The working gas cross-flows a front edge of the vane and flows away on a rear edge of the vane. The vane has a first and a second channel system for guiding two media separated from the turbine blade. Combustion taking place inside is reduced in a safe manner to maintain the service life of the turbine blade and to prevent damage in the gas turbine, such that a first outlet connected to the first channel system is arranged in the region of the rear edge for blowing out the first media into the working gas and a second outlet connected to the second channel system is arranged in the region of the rear edge for blowing out the second medium.

17 Claims, 6 Drawing Sheets

TURBINE BLADE

CROSS REFERENCE TO RELATED APPLICATIONS

This application is the US National Stage of International Application No. PCT/EP2007/051403, filed Feb. 13, 2007 and claims the benefit thereof. The International Application claims the benefits of European application No. 06008319, filed Apr. 21, 2006, both of the applications are incorporated by reference herein in their entirety.

FIELD OF THE INVENTION

The invention relates to a turbine blade with a profiled blade airfoil which is exposable to circumflow by an operating gas, which has a leading edge which is exposable to inflow of the operating gas and also a trailing edge on which the operating gas can flow out, and with a first passage system and with a second passage system for the separate guiding of two different media which can be fed separately to the turbine blade, wherein the first passage system leads to at least one first discharge opening, which is arranged in the region of the trailing edge, for blowing out the first medium into the operating gas.

BACKGROUND OF THE INVENTION

Such a turbine blade is known for example from WO 2005/003517 A1. The blade walls which form the blade airfoil enclose a cavity on the inside in which cooling air can flow. Furthermore, further passages for guiding a second medium, specifically fuel, are provided in the blade wall of the turbine blade. Holes extend through the blade wall of the turbine blade, through which holes the cooling medium which flows inside the turbine blade can discharge outwards into a hot gas space. In order to produce a combustible mixture, connecting passages, which connect the fuel-guiding passages to the through-holes, are provided in the blade wall. As a result, fuel can be mixed with cooling air still inside the through-holes and as a combustible mixture can be blown out into the hot gas which flows around the turbine blade. With such a turbine blade, both the hot gas which flows through the turbine and the cooling air which discharges from the turbine blade can be reheated as a result of the combustion of the mixture, which in general is carried out for increasing the level of performance of the gas turbine, for reducing the pollutant emissions and for improving the efficiency of the gas turbine, and is known as a form of carnotization.

Furthermore, a combustion chamber with a multiplicity of porous heat-shield elements is known from WO 99/46540 A1, by means of which a combustible mixture can be subsequently introduced into the combustion chamber of a gas turbine, i.e. outside the burners of the gas turbine.

A turbine blade with a multiplicity of internally arranged cooling passages which extend from the blade root towards the blade tip and also formed in a meandering configuration in the process, is known from EP 0 896 127 A2. The cooling passages are connected to altogether three root-side openings for feeding cooling air of different quality. One of the openings is connected to a rectilinear cavity which extends from the blade root to approximately the blade tip. This cavity is directly adjacent to the trailing edge of the blade airfoil of the turbine blade and is in flow communication with the discharge openings which are arranged on the trailing edge. The cooling medium which is fed through the corresponding root-side opening can flow through the cavity and can leave the trailing edge via the discharge openings over the approximately entire length of the trailing edge with a cooling effect in the process. At the same time, the turbine blade has a further cavity, on the blade-tip-side end of which a cooling passage, which extends transversely to the longitudinal extent of the blade airfoil, is provided. This cooling passage leads to the trailing edge only in its blade-tip-side region.

Furthermore, it is known from U.S. Pat. No. 6,551,063 to construct the trailing edge of a turbine blade in modules by a plate-like element which covers the trailing edge ribs being soldered on or welded on, in the case of a turbine blade with a so-called "cut-back" trailing edge.

It is disadvantageous to the concepts which are also known as "in-situ blade reheat" that, as a result of the mixing of cooling air and fuel in the components, the reaction partners can ignite as a result of self-ignition or flashback. As a result of this, stable combustion processes are possibly formed inside the turbine blade so that the cooling effect of the fuel-air mixture is lost, or the component can be damaged as a result of the combustion which occurs internally.

SUMMARY OF THE INVENTION

It is therefore the object of the invention to provide a turbine blade for a gas turbine in which a combustion which takes place inside is safely avoided for maintaining the service life of the turbine blade and for avoiding damage in the gas turbine.

This object is achieved with a turbine blade according to the invention in which the first discharge openings, which are connected to the first passage system, are arranged in the region of the trailing edge, and in which at least one second discharge opening, which is arranged in the region of the trailing edge, for blowing out the second medium is connected to the second passage system.

The invention is based on the knowledge that it is primarily necessary to feed the reaction partners, i.e. the two media, separately inside the turbine blade and to avoid a mixing inside the volume of the component in order to safely prevent an unwanted combustion which may possibly take place inside the turbine blade. A flashback into the component, which the pressure which prevails in the operating gas and possibly also the flow direction of the operating gas may bring about, also has to be safely avoided. For this reason, the discharge openings, from which on the one hand the first medium, for example cooling air, discharges, and on the other hand from which the second medium, for example fuel, discharges, are not opened transversely or towards the flow direction of the operating gas but are arranged on the trailing edge of the turbine blade so that the outflowing media have at least one flow component acting in the same direction in three-dimensional space as the operating gas.

Since the two media are blown out of the component on the trailing edge and are blown into the operating gas, the reaction partners can only be mixed to form a possibly combustible mixture outside the turbine blade. The proposed solution, furthermore, enables quick mixing of a first medium with a second medium, the mixture which results in this way being admixed in turn with the operating gas of the turbine. The risk of flashbacks of a perhaps combustible mixture is therefore effectively prevented since no combustible mixture consisting of a first and second medium occurs inside the turbine blade or, on account of the pressure in the operating gas and/or on account of its flow direction, can be blown back into the turbine blade. Consequently, with the disclosed invention an especially reliable turbine blade can be disclosed in which a combustible mixture consisting of a first medium and second medium cannot be fed back. Self-ignition of the mixture inside the turbine blade can be safely avoided, maintaining the service life of the turbine blade. In a turbine which is equipped with the turbine blade according to the invention, the operating gas which flows in the turbine can be reheated reliably and without risk with regard to a fire taking place inside the turbine blade.

Flashback safety is ensured above all by the fact that the fuel is injected close to the trailing edge in the region of the directed operating gas flow, i.e. with two identical flow direction components and without forming backflow zones. Therefore, residence time distributions, which are caused by flow vortices and which can bring about a combustion inside the turbine blade, do not occur.

Naturally, the proposed turbine blade can also be used for the addition of other fluid media as fuel or air inside a turbine, regardless of whether it is a gas or steam turbine.

An exceptionally efficient low-emissions combustion of the fuel in the operating gas can be achieved if the trailing edge extends along a blade airfoil principal axis from a root region of the blade airfoil to a tip region which lies opposite said root region, wherein the second discharge opening is arranged at least partially at the same height as the first discharge opening, as seen along the blade airfoil principal axis. Therefore, for the first time it is possible for both fuel and combustion air to be injected at the same time into the operating gas through the trailing edge at a radial height of the annular passage-shaped operating gas space of the gas turbine in order to achieve an especially efficient combustion. Consequently, the first discharge opening and the second discharge opening do not lie one behind the other but next to each other in an overlapping manner, as seen in the direction of the blade airfoil principal axis.

In this case, it is particularly advantageous for combustion of the fuel in the operating gas if the trailing edge extends along a blade airfoil principal axis from a root region of the blade airfoil to a tip region which lies opposite said root region, wherein the second discharge opening is arranged at least partially at the same height as the first discharge opening, as seen along the blade airfoil principal axis. Therefore, for the first time it is possible for both fuel and combustion air to be injected at the same time into the operating gas through the trailing edge at a radial height of the annular passage-shaped operating gas space of the gas turbine in order to achieve an especially efficient combustion. Consequently, the first discharge opening and the second discharge opening do not lie one behind the other but next to each other in an overlapping manner, as seen in the direction of the blade airfoil principal axis.

In order to inject quantities of first and second medium which are particularly well matched to each other into the operating gas within a comparatively narrow section of the trailing edge, one of the first discharge openings in each case with one of the second discharge openings in each case forms an overlapping pair of openings, as seen along the blade airfoil principal axis. The configuration of a turbine blade according to the invention, in which a plurality of pairs of openings which are arranged next to each other follow each other along the trailing edge so that the parallel blowing out of the two media can be carried out over the entire height of the blade airfoil of the turbine blade, is especially preferred in this case. In order to achieve this, the first and the second discharge openings, alternatively to the aforementioned solution, can also extend in each case over the entire height of the trailing edge.

In a first development, it is proposed that in the region of the trailing edge means are provided which bring about a mixing of the first medium with the second medium directly downstream of the discharge openings. The blowing out of the two media is carried out in a manner which gives rise to an extremely quick mixing after their entry into the operating gas space within a very short distance and within a very short time. As a result, it is ensured that in the operating gas space an exceptionally homogeneous mixing of the two media is first carried out, and then subsequent to this, for reheating the operating gas which flows through the turbine, the mixture is mixed with this operating gas and automatically ignited on account of the temperature which prevails in the operating gas. This enables an especially low-emissions combustion of the combustible mixture, which is produced in the first mixing step, by means of premix flames.

As a result of the mixing within a short reaction distance and reaction time, the effect is achieved, furthermore, of the mixture being combusted before leaving the annular passage-shaped operating gas space, since the energy increase of the operating gas which takes place as a result of the reheating of the operating gas is only for power increase and efficiency increase of the turbine when the reheated operating gas flows past the rotor blades of the turbine for converting the flow energy into mechanical energy.

As a result of the short reaction distance, the overall length of the turbine can also be shortened. Therefore, an especially compact and inexpensively producible gas turbine, which is equipped with the turbine blades according to the invention, can also be disclosed by the invention.

Furthermore, it is proposed that the means create a backflow-free mixing of the first medium with the second medium by at least one of the two media, or both of the two media, being blown out at least approximately on a sharp edge. As a result of the sharp edge, backflow-free vortices are created which, on account of their flow direction, prevent the mixture flowing back into the turbine blade. Furthermore, feeding back of the mixture which is present in the operating gas space should be avoided anyway as a result of pressure ratios in which the pressure which prevails in the two media at the discharge opening is greater than the pressure of the operating gas. A combustion process of the mixture which may possibly take place inside the turbine blade can therefore be effectively avoided, which maintains the service life of the turbine blade.

It is also proposed that the means which are arranged in the trailing edge of the blade airfoil comprise at least one connecting passage which connects at least one the two passage systems to the discharge opening which is associated with it, wherein the connecting passage is shaped such that this imparts an eddy or vortex to the medium which flows through it. The connecting passage which connects the passage system to the corresponding discharge opening therefore has a spatial shape which imparts an eddy or vortex to the medium which flows through it, which is continued after discharging from the discharge opening. The directions of the eddy or of vortex are selected so that, directly after being discharged from the discharge opening, the two media flow into each other and so bring about their effective mixing. This leads to an especially homogeneous mixture and to its especially efficient and low-emissions combustion as a result of a self-ignited premix flame. Consequently, the pollutant loading which is created by the gas turbine, especially the NOx emissions, can be minimized.

The connecting passages for example are spiralled in the manner of a corkscrew so that the media which discharge through the discharge openings try to maintain this helical movement, i.e. its flow direction, after discharging. With suitable connecting passages, i.e. with an offset arrangement of the connecting passages which are shaped like a corkscrew in the manner of a double-thread screw, an eddy can therefore be imparted in each case to the two media, which enables them to mix through with each other particularly efficiently after their discharge from the connecting passages.

In a further advantageous development, it is proposed that the means are provided in the discharge openings. Consequently, in the discharge openings themselves and not only in the upstream connecting passages, turbulators, dimples or the like can be provided as the means which impart an eddy or backflow-free vortex to the medium which flows out through them. A nozzle with a star-like encompassing contour is preferably inserted in a circular opening as a separating element for the two media. One of the two media can flow out from the center of the nozzle, and the other of the two media can flow out from the cross-sectional area between the circular opening and the star-like contour. This nozzle-shaped configuration brings about a further improved mixing through of the two outflowing media.

In addition, it is proposed by the invention that the means for mixing the first medium with the second medium are provided on an inner side of the suction-side trailing edge wall of the blade airfoil, and/or on an inner side of the pressure-side trailing edge wall, which trailing edge wall or walls is or are exposable to circumflow by the operating gas.

The means which are provided in the discharge openings can also be a freely oscillating tongue which is clamped at one end and which, as a result of its flow-induced oscillations, mixes the two media with each other particularly efficiently.

If the blowing out of the two media is carried out essentially or approximately parallel to the flow direction of the operating gas, a mixing through of the two media can take place just marginally inside the turbine blade in the region of the trailing edge without compromising the flashback safety of the component. The mixing through of the two media for example can be achieved by means of a field of pins and/or by means of turbulators.

It is also proposed that the blade airfoil is cast, and the means for mixing the two media are fastened in the blade airfoil as a separately produced insert. The structural features of the turbine blade which are proposed by the invention in the casting method must customarily be produced in an especially costly manner. Therefore, the invention proposes to prefabricate these structures as a separately produced insert and then to fasten the insert in the cast blade airfoil. As a result of this, an especially inexpensive turbine blade can be disclosed.

The invention also proposes a gas turbine which is equipped with a turbine blade according to the invention, wherein the advantages which are associated with the turbine blade can also be transferred to the gas turbine.

BRIEF DESCRIPTION OF THE DRAWINGS

Further advantages and features are to be gathered from the following description of exemplary embodiments. Elements which are essentially the same are identified with the same designations. In addition, reference is made to the description for the exemplary embodiment with regard to like features and functions. In the drawing.

DETAILED DESCRIPTION OF THE INVENTION

Figure 1:
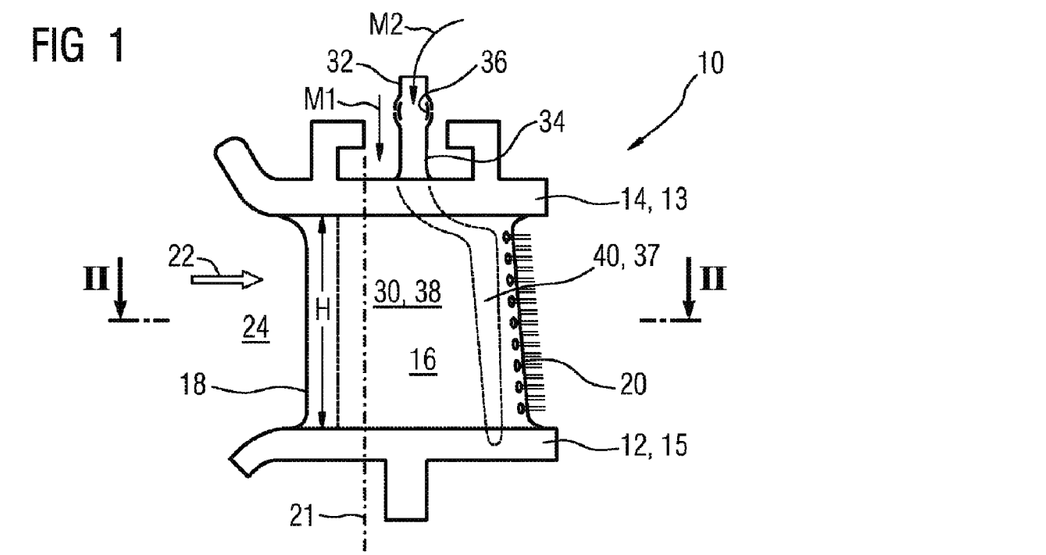
FIG. 1 shows a schematic view of a turbine blade with a feed pipe for fuel.

FIG. 1 shows a schematic view of a turbine blade as is used for example in one of the front stages of the turbine of for example a stationary axial gas turbine. The turbine blade 10 is represented as a stator blade and, with regard to its installed position in the gas turbine, comprises an inner platform 12, an outer platform 14 and a blade airfoil 16 which extends between the platforms in the radial direction of the gas turbine. The outer platform 14 in this case represents a root region 13 upon which the turbine blade 10, for example on a stator blade carrier, can be fastened. A tip region 15, which lies opposite the root region 13, in this case comprises the inner platform 12.

Figure 2A:
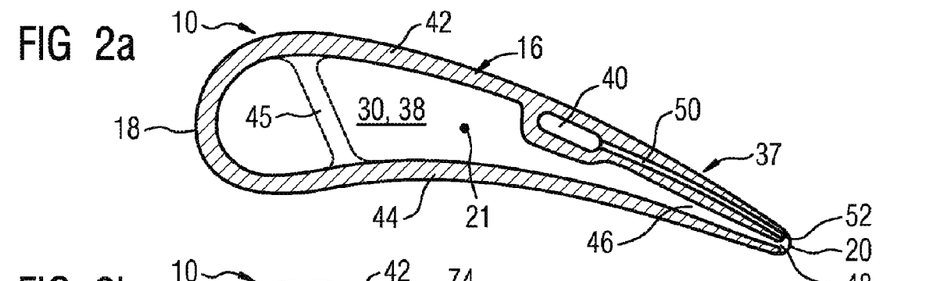
FIG. 2a shows a cross section through the blade airfoil of the turbine blade with a passage system, cast in a blade wall, for guiding a second medium.
Figure 2B:
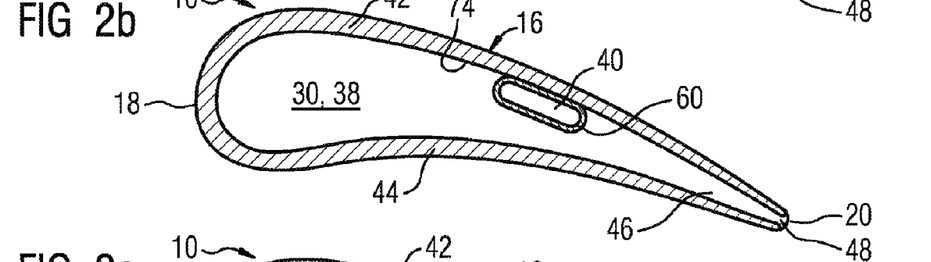
FIG. 2b shows a cross section through the blade airfoil of the turbine blade with a passage system, which is formed by a tube-like insert, for guiding the second medium.
Figure 2C:
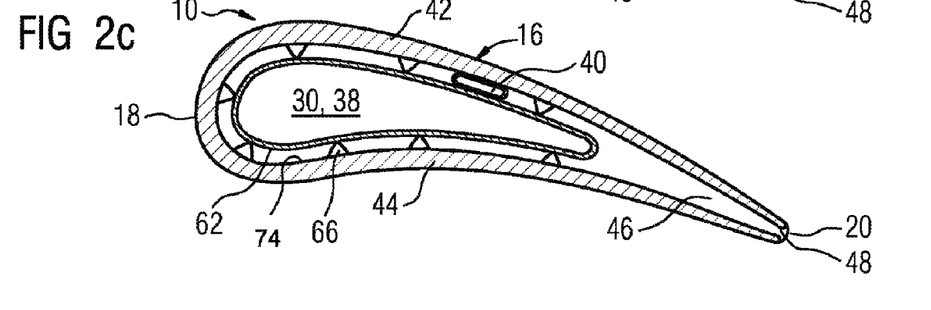
FIG. 2c shows a cross section through the blade airfoil of the turbine blade with a passage system, which is enclosed by an impingement cooling plate, for guiding the second medium.

The blade airfoil 16, as FIG. 2a to FIG. 2c show, is curved in cross section in the shape of a droplet and extends from a leading edge 18 to a trailing edge 20. A blade airfoil principal axis 21 in this case extends essentially parallel to the trailing edge 21 or along the radial direction of the gas turbine. During operation of the gas turbine, the blade airfoil 16, which has a height H, is exposed to circumflow by an operating gas 22 which first flows onto the turbine blade 10 at the leading edge 18 and after flowing round the blade airfoil 16 leaves at the trailing edge 20. In the meantime, it flows along an annular passage-shaped operating gas space 24 which is at least partially delimited radially inwardly by the inner platforms 12 and radially outwardly by the outer platforms 14 of the turbine blades 10.

The blade airfoil 16 is formed with its inside being hollow and inside this has at least one first passage system 30 and a second passage system 40 which are formed separately from each other. A medium M1 or M2 can therefore be guided separately in each passage system 30, 40. The first medium M1 for example is fed through the casing of the turbine from radially outside to the first passage system 30. The second medium M2, which preferably is not to be mixed with the first medium M1 inside the turbine blade 10, is fed via a separate feed pipe 32 to the turbine blade 10. For this purpose, the turbine blade 10 has a connector 34 to which the feed pipe 32 is connected in a gastight manner, for example by means of a seal 36 which is known from steam cooling. For further guiding of the second medium M2 in the blade airfoil 16, a pipe system 37 branches out from the connector 34 on the inside.

The second passage system 40 which is provided inside the blade airfoil 16 for guiding the second medium M2 can be configured in different ways.

The blade airfoil 16 which is shown in cross section in FIG. 2a has a central cavity 38 which, as part of the first passage system 30, is provided for guiding the first medium. The first passage system 30, in the example which is shown, comprises the entire cavity 38 of the turbine blade 10. Alternative configurations are conceivable, in which the cavity 38 can be divided into a plurality of regions by for example a rib 45 extending from the pressure-side wall 44 to the suction-side wall 42. This rib 45 is indicated in FIG. 2a by means of broken lines in the region of the leading edge 18.

The first medium M1, preferably cooling air, which flows inside the first passage system 30 serves for cooling the turbine blade 10, and after cooling has been carried out is blown out from the trailing edge 20 of the turbine blade 10 in the manner of open cooling and so is blown into the operating gas 22 flowing approximately parallel. For this purpose, the turbine blade 10 has a first connecting passage 46 which leads to the first discharge opening 48 which is provided in the region of the trailing edge 20. In FIGS. 2a, 2b and 2c which are shown the cavity 38 merges in a stepless manner into the first connecting passage 46 and this merges into the first discharge opening 48.

According to FIG. 2a, the second passage system 40, which is provided for the further guiding of the second medium M2, comprises a cavity 40 which is provided in the suction-side blade wall 42. The second passage system 40, by means of a suitable casting core, was also produced directly when casting the blade airfoil 16 and is fluidically connected to second discharge openings 52 via second connecting passages 50.

The first passage system 30 and also the second passage system 40 extend in each case over the height H of the blade airfoil 16 which extends in the radial direction of the gas turbine. A first discharge opening 48 for the first medium M1, which extends over the entire height H of the blade airfoil 16, and a plurality of second discharge openings 52 for the second medium M2, which are evenly distributed along the height H, are provided on the trailing edge 20 of the turbine blade 10. It is also conceivable that a plurality of first discharge openings 48 and/or only one second discharge opening 52 are, or is, provided. It is important for this and for the subsequently described developments that both first and second discharge openings 48, 52 lie at least partially at the same radial height of the trailing edge 20 and therefore overlap in order that the two media M1, M2 are blown out as close as possible to each other.

FIG. 2b shows an alternative development of the turbine blade 10 in cross section, in which the second passage system 40 for guiding the second medium M2 comprises a tube 60 which is inserted in the cavity 38 of the turbine blade 10. The tube 60 is connected over the height H of the blade airfoil 16 to the inner side 74 of the suction-side blade wall 42. The connecting passages, which are not shown in FIG. 2b, have already also been produced when casting, or drilled subsequently, for blowing out the medium M2 in the suction-side blade wall 42, in a similar way to the turbine blade 10 which is shown in FIG. 2a, and on the one hand lead to the tube 60 and on the other hand lead to the discharge opening 52.

FIG. 2c shows a further variant. An impingement cooling insert 62, which is required for impingement cooling of the blade walls 42, 44, is at a distance from the inner side 74 of the blade airfoil 16 by means of spacers 66 and in cross section is formed so that inside the cavity 38 this insert contributes both to the forming of the first passage system 30 and of the second passage system 40, and hermetically separates the passages 30, 40 from each other in the process.

The second connecting passages 50 may have also been cast in the suction-side blade wall 42 of the turbine blade 10 in a similar way to FIG. 2b.

Fuel guiding is carried out in the case of the previously described developments in such a way that parts of the second passage system 40, which can also be referred to as a fuel passage system, penetrate the turbine blade 10 in the radial direction, and in this case is formed either as a passage which is cast in the blade wall 42, 44 (FIG. 2a), as a separately constructed single-wall or multi-wall tube (FIG. 2b) or as a separate fuel passage from the impingement cooling insert (FIG. 2c). Each of the proposed developments enables a guiding of fuel close to the trailing edge 20 so that a constructionally simple injection of fuel into a region of directed operating gas flow is possible.

The developments which are shown in FIG. 2a to FIG. 2c make it possible to guide the fuel in the turbine for carrying out the "in-situ blade reheat" process and to add this fuel to the operating gas 22 which flows there, without the cooling, the strength or the aerodynamics of the turbine blade 10 being negatively influenced, wherein on account of the hermetically separated guiding of the two media M1, M2 a mixing inside the turbine blade 10 is always reliably prevented.

Figure 3:
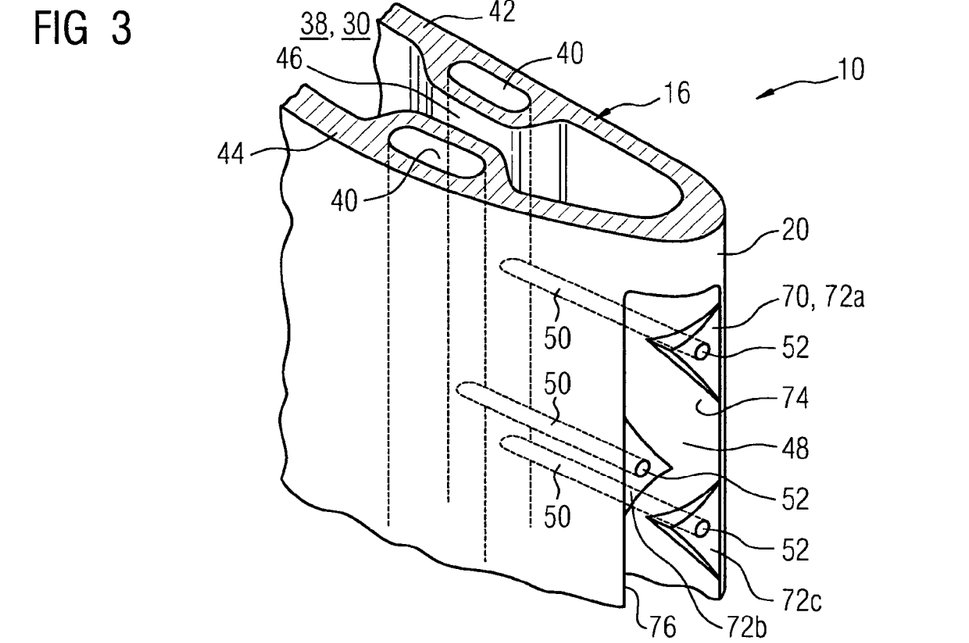
FIG. 3 shows a perspective view of the trailing edge of the blade airfoil of the turbine blade.

FIG. 3 shows the perspective view of the trailing edge 20 of the blade airfoil 16, blanking out the outer and the inner platform. The cavity 38, which is arranged inside the turbine blade 10, as part of the first passage system 30 merges into the first connecting passage 46 which in its turn merges in a stepless manner into the first discharge opening 48 which is arranged in the trailing edge 22 of the turbine blade 10.

Cast-in second passages 40 are provided in each case both in the suction-side blade wall 42 and in the pressure-side blade wall 44 and extend over the height of the blade airfoil 16. The second passages 40 are connected via second connecting passages 50 to the second discharge openings 52.

Due to the development which is shown, mixing of the two media M1, M2 inside the turbine blade 10 is effectively avoided.

Means are provided in the region of the trailing edge 20 which effect an eddying or swirling of the two media M1, M2 which flow out of the turbine blade 10. The means which are shown in FIG. 3 are so-called mixing inserts 70 for improved mixing of the two outflowing media M1, M2. The mixing inserts 70 are formed in the shape of a pyramid, as wedges or also as tetrahedrons 72, in the rear, i.e. downstream, triangular surface of which the second discharge opening 52 is provided in each case. Two tetrahedrons 72a, 72c, the free points of which face the inner side 76 of the pressure-side blade wall 44, for example are provided on the inner side 74 of the suction-side blade wall 42. A further tetrahedron 72b is provided between the two tetrahedrons 72a, 72c but arranged on the inner side 76 of the pressure-side blade wall 44 so that for the first discharge opening 48 a meander-shaped gap is created along the trailing edge 20 from the outer end to the inner end.

Inside the turbine blade 10 the first medium M1, preferably cooling air, can flow in the cavity 38 in a known manner, for example meander-like, in order to protect in the meantime the material which forms the blade airfoil 16 against thermal overloading. From there, the first medium reaches the first discharge opening 48 via the first connecting passages 46. Similarly to this, the second medium M2, preferably fuel, which is fed to the second passages 40, is guided to the second discharge openings 52.

On account of the mixing inserts 70 which are sharp-edged in their contour, especially the angular tetrahedrons 72, a backflow-free swirling of the cooling air which flows out through the first discharge opening 48 can be achieved. The fuel which in the meantime flows into the swirled cooling air is then mixed with the cooling air in a particularly efficient manner.

Despite the separated feed of the two media M1, M2, it is possible in this way to achieve efficient mixing with a short mixing time and a short mixing distance in order to combust the self-igniting mixture with low emissions, forming small premix flames. As a result of this, the overall length of the turbine can also be reduced. Furthermore, on account of the selected outflow directions of the media M1, M2 which leave the turbine blade 10, it can be ensured that a backflow of the mixture into the discharge openings 48, 50 is safely avoided. Accordingly a fire cannot occur inside in the passages 30, 40, 46, 50 of the turbine blade 10 so that the service life of the turbine blade 10 is maintained.

Figure 4:
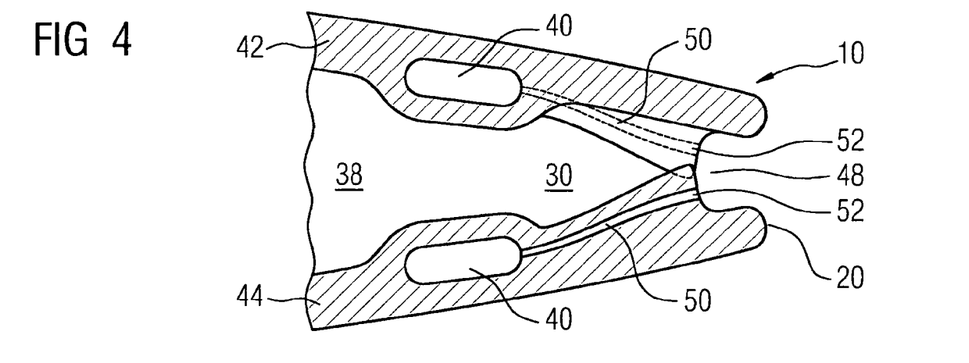
FIG. 4 shows the cross section through the blade trailing edge according to FIG. 3.

FIG. 4 shows the cross section through the development of a turbine blade according to FIG. 3, in which the tetrahedrons 72 which lie opposite each other in an offset manner, the suction-side blade wall 42, the pressure-side blade wall 44, the two first passages 30 and also the two second passages 40 are shown. Instead of the tetrahedrons 72, other geometric shapes are also conceivable as mixing inserts 70.

Figure 5:
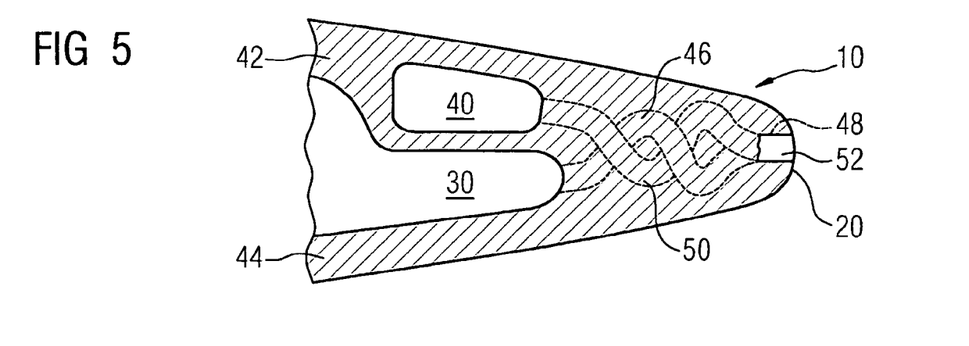
FIG. 5 shows the cross section through the trailing edge of the turbine blade with connecting passages which wind around each other in the manner of a double helix.

FIG. 5 shows an alternative development of the invention, in which the cavity 38 which is provided inside the turbine blade 10 is provided for guiding cooling air as the first medium M1. The second passage 40 for guiding the second medium M2 is provided in the pressure-side blade wall 42. Discharge openings 48, 52, which are distributed in each case over the height of the turbine blade 10, are provided in pairs on the trailing edge 20. Each first and each second discharge opening 48, 52 is connected in each case to the associated passage system 30, 40 via the helical connecting passage 50, 46 which is associated with it. In this case two connecting passages 46, 50 are always entwined with each other in the manner of a double helix. The media M1, M2, which flow through the helically winding connecting passages 46, 50, on account of the helical shape also continue to flow with the consequently imparted eddy after leaving the turbine blade 10. The connecting passages 46, 50 are oriented to each other so that after the discharging of the two media M1, M2 from the discharge openings 48, 52 these flow into each other and so bring about a particularly efficient mixing within an especially short mixing distance and short mixing time. This particularly efficient mixing is a precondition for the low-emissions combusting of the mixture with short complete combustion duration after self-ignition has been carried out on account of the temperature which prevails in the operating gas 22. As a result of the combustion of the mixture, the operating gas 22 or the cooling air which flows into the turbine is reheated, as a result of which its energy content is increased and can be used as mechanical energy which is provided by the turbine. The efficiency of the turbine is also increased as a result.

Figure 6:
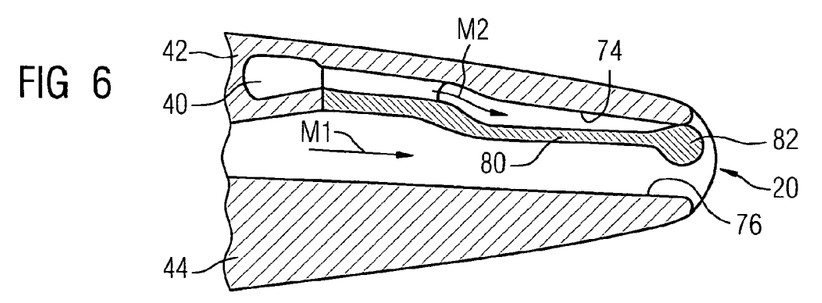
FIG. 6 shows the cross section through the trailing edge of the turbine blade with a movable element which is fastened in the trailing edge.

A further variant for creating a particularly efficient mixing of the two media M1, M2 which are guided separately in the turbine blade 10 is shown in FIG. 6, which shows a cross section through the trailing edge 20 of a modified turbine blade 10.

The means for creating a particularly efficient mixing is a movable plate element 80 which is clamped in a fixed manner at one end, with a free end 82 opposite the fixed end. The plate element 80 is fastened either on the inner side 76 of the pressure-side blade wall 44 or on the inner side 74 of the suction-side wall 42, for example by welding or soldering, and during operation, on account of the media M1, M2 which flow along it, periodically oscillates back and forth between the two opposite inner sides 74, 76 of the pressure-side blade wall 44 and suction-side blade wall 42, so that the discharge openings 48 and 52 become mutually larger and smaller. In doing so, the outflowing media M1, M2 swirl so that downstream of the plate element 80 a particularly efficient mixing of the two media M1, M2 takes place, achieving the aforementioned advantages. According to FIG. 6, the free end 82 of the plate element 80 is slightly thickened in cross section so that it has an increased mass at this point. This makes the maintaining of the oscillation of the plate element 80 easier on the one hand, and on the other hand serves for making the creation of vortices easier, for example for the creation of Kármán vortices. It is not necessary for the free end 82 of the plate element 80 to come to lie on the inner sides 74, 76 of the blade walls 42, 44 during the oscillating process.

A further advantage of the development which is shown in FIG. 6 is that if outflowing of the medium M2 is prevented, the passage system 40 can be isolated from the operating gas space 24 since the pressure which prevails in the operating gas 22 or in the medium M1 presses the plate element 80 onto the inner side 74 of the suction-side blade wall 42. The counterpressure which is otherwise caused by the medium M2 is absent in this case. The discharge opening 52 is then closed and is therefore protected against entry of operating gas.

Figure 7:
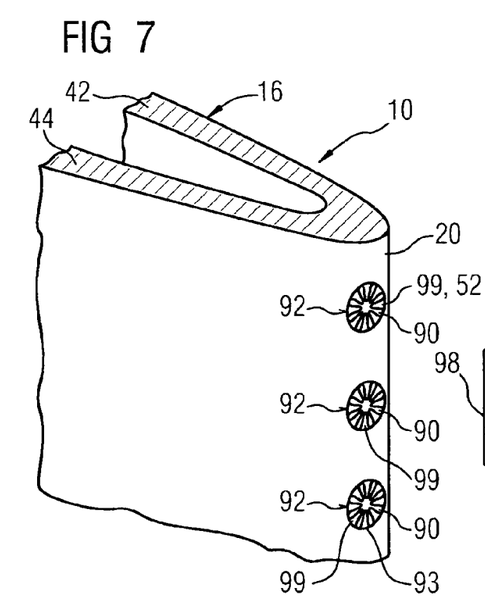
FIG. 7 shows the perspective view of the trailing edge of the turbine blade with nozzles which are arranged in the region of the trailing edge.
Figure 8:
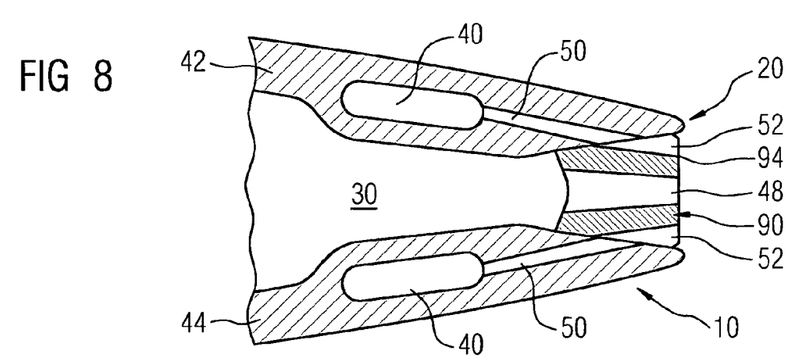
FIG. 8 shows the cross section through the trailing edge of the turbine blade according to FIG. 7 with the nozzle-shaped discharge opening arranged thereupon.
Figure 9:
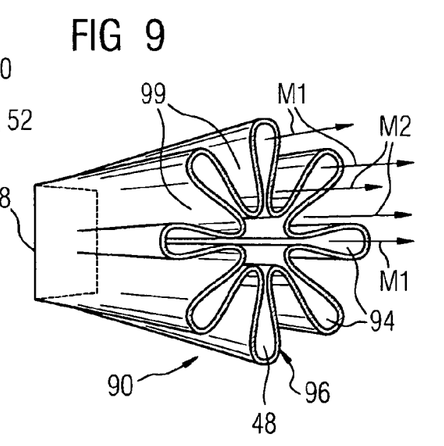
FIG. 9 shows the nozzle which can be fastened in the trailing edge of the turbine blade according to FIG. 7, in perspective view.

FIG. 7 to FIG. 9 show in different views the trailing edge 20 of the turbine blade 10 with discharge openings 48, 52 which are formed upon it in the shape of nozzles. Openings 92 with a circular contour 93, which extend parallel to the flow direction of the operating gas 22 and in which a star-shaped insert 90 is inserted in each case as means for creating vortices in the outflowing media M1, M2, are distributed along the trailing edge 20. The insert 90, as shown in FIG. 9, has an encompassing contour 96 in the manner of a star on the outflow side with regard to the flow direction of the two media M1, M2. On the inflow side, a considerably simpler contour 98, for example that of a rectangle, is provided.

Inserted in the opening 92, the area which is enclosed by the star-shaped encompassing contour 96 of the insert 90 forms the first discharge opening 48. The area which lies between the circular contour 93 of the opening 92 and the area which lies outside the star-shaped contour 96 then forms the second discharge opening 52.

As long as the turbine blade 10 in the region of the trailing edge 20 according to FIG. 8 is provided with two second passages 40 which are provided in each case in the blade walls 42, 44, and also is provided with the opening 92 integrated in the trailing edge (cf. FIG. 7), an especially simple swirling of the two media M1, M2 which flow out at the trailing edge 20 of the turbine blade 10 can be achieved with an insert 90 which is configured according to FIG. 9 and inserted in the opening 92. The first medium M1, preferably cooling air, then flows through the rectangular cross-sectional area in the inside of the insert 90 and, on account of the contour of the insert 90 which changes along the flow direction, is guided in accordance to this. The outflow-side contour 96 of the insert 90 with fingers 94 which project in the shape of a star determines that the medium M2, which is fed from the second connecting passages 50, can flow into the spaces 99 which lie between the fingers 94. With a trailing edge 20 with a plurality of nozzle-like discharge openings 48, 52, the advantages which are associated with the invention can also be achieved. This development, which is also referred to as a bloom mixer, has exceptionally intensive mixing rates, moreover.

Figure 10:
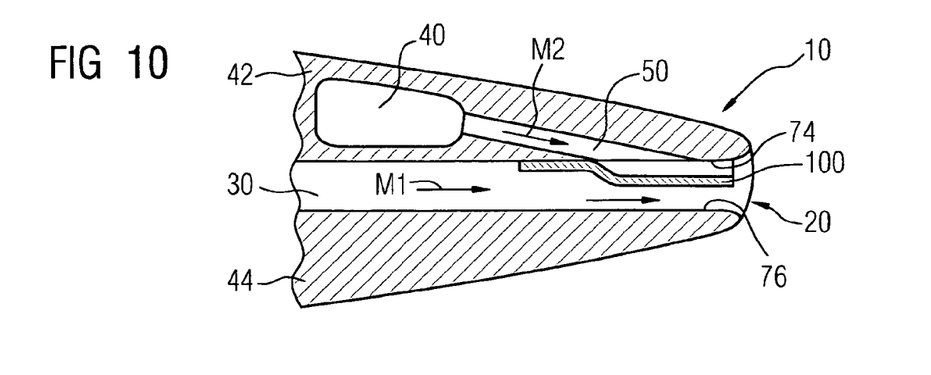
FIG. 10 shows the cross section through the trailing edge of the turbine blade with a corrugated insert.
Figure 11:
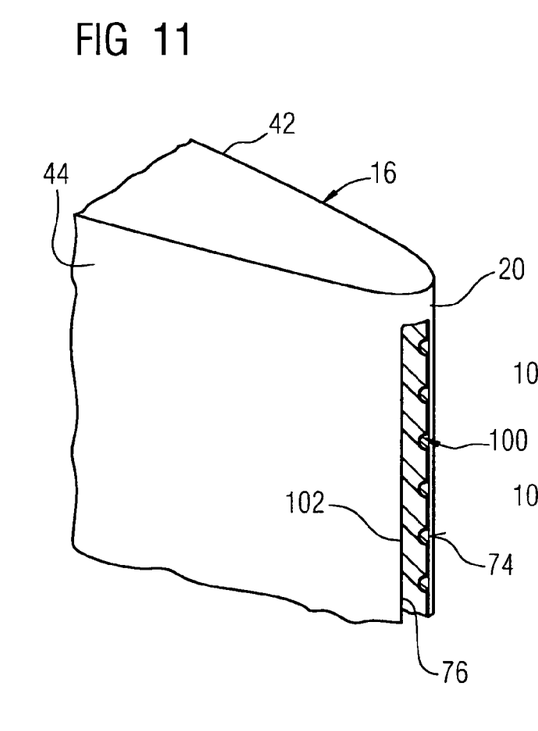
FIG. 11 shows the trailing edge of the turbine blade with the corrugated insert.
Figure 12:
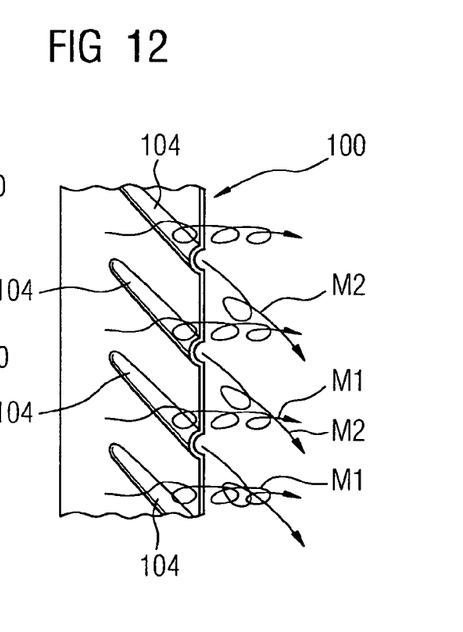
FIG. 12 shows the corrugated insert for a turbine blade according to FIG. 11.

FIG. 10 to FIG. 12 show a further development of the invention, in which a corrugated insert 100 for creating vortices in the outflowing media M1, M2 is provided in the region of the trailing edge 20 over its height H. For this purpose, the trailing edge 20 has a rectangular slot 102 which extends over its height H and which is divided into two sections over its height by means of an insert 100 which is inserted therein. The insert 100 is at a distance from the two inner sides 74, 76 of the blade walls 42, 44, wherein the distance between each inner wall 74, 76 and insert 10 periodically increases and decreases on account of the corrugated shape of the insert 100, as seen along the trailing edge 20. The front 104 of the corrugations of the insert 100 which is provided as means for creating vortices is inclined to the flow direction of the media M1, M2 so that the media M1, M2 which are guided on both sides of the insert 100 flow transversely across the corrugations of the insert 100 and are swirled by these so that a homogeneous mixing of the two media M1, M2 downstream of the insert 100 is carried out. The resulting mixture reheats the operating gas 22, or can also serve for emissions treatment of the operating gas 22.

Figure 13:
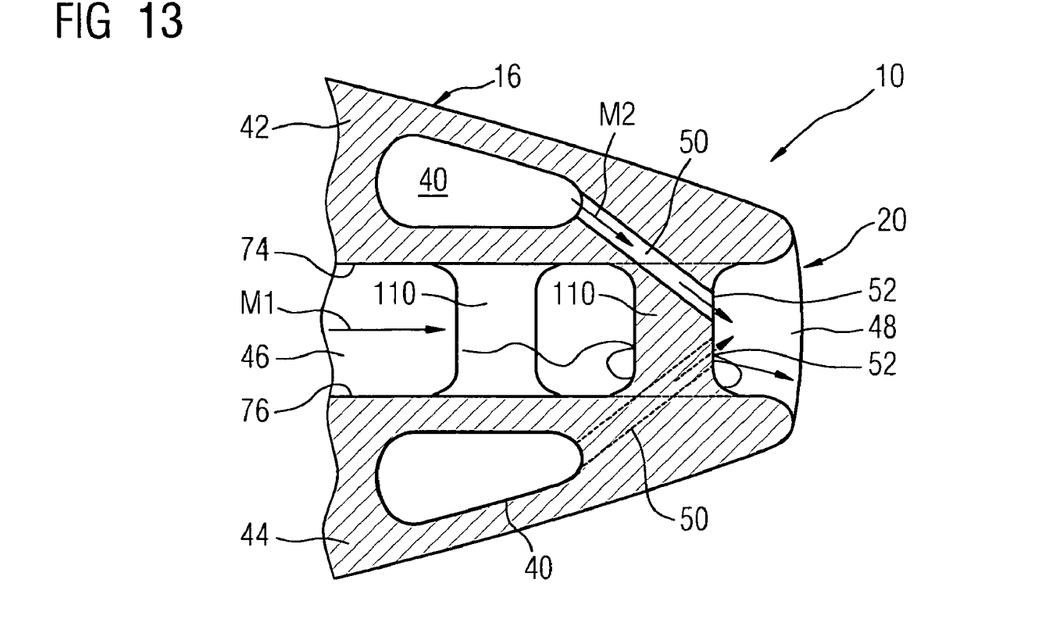
FIG. 13 shows a cross section through the trailing edge of the turbine blade with a field consisting of pins which is arranged in the trailing edge.
Figure 14:
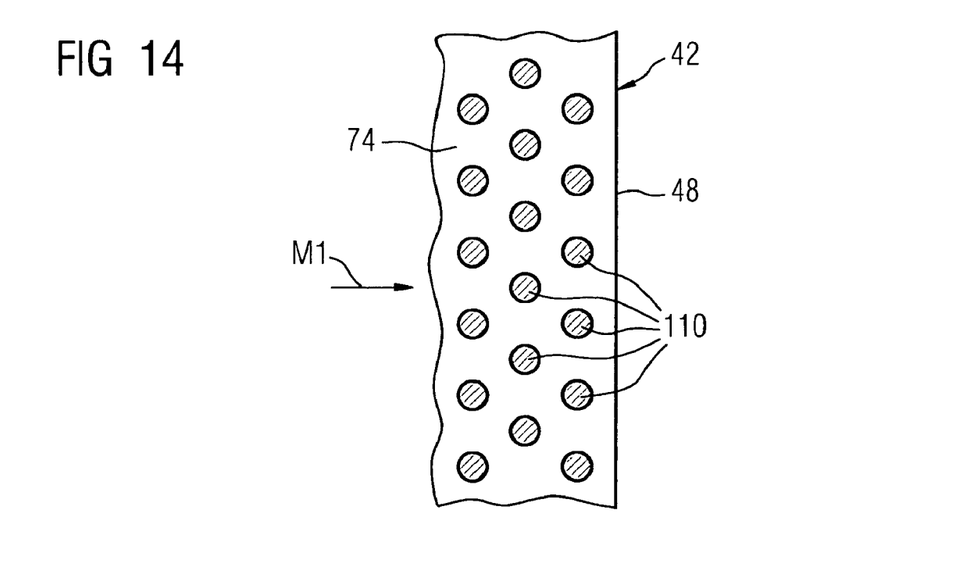
FIG. 14 shows the longitudinal section through the turbine blade according to FIG. 13 in the region of the trailing edge.

FIG. 13 and FIG. 14 show an alternative development, in which only the first medium M1 which is guided through the first connecting passages 46 is swirled on account of pins 110 which are arranged in an offset manner and which extend from the inner side 76 of the pressure-side blade wall 44 to the inner side 74 of the suction-side blade wall 42, forming a series of vortex streets. For particularly efficient mixing, the blowing out of the second medium M2 from the turbine blade 10 into the first medium M1, which flows in a swirled manner, is carried out by means of second discharge openings 52 which are provided on the trailing edge 20 and the second upstream connecting passages 50 of which extend in a straight line but are inclined towards the outer or inner platform. Therefore, the means for creating vortices in the medium M1 is the field of pins 110 which is provided in the first connecting passage 46. Instead of pins 110, dimples, turbulators or grooves can also be provided on the inner sides 74, 76.

Figures 15, 16:
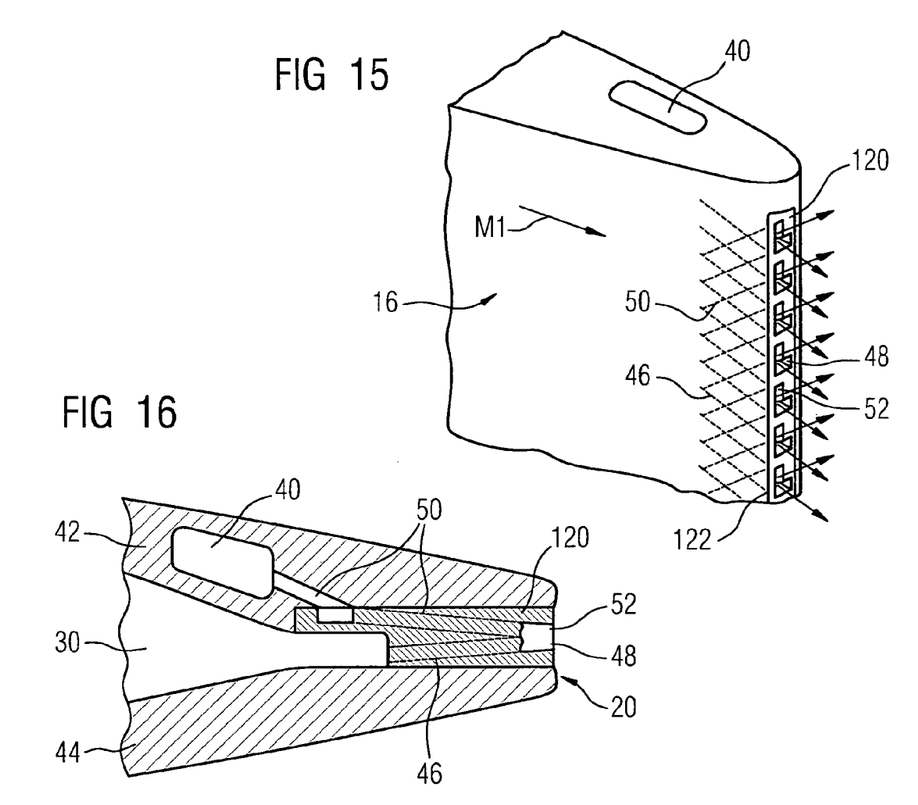
FIG. 15 shows, in perspective view, the trailing edge of the turbine blade with a crosswise blowing out.
FIG. 16 shows the cross section through the trailing edge of the turbine blade with a crosswise blowing out according to FIG. 15.
Figures 17, 18:
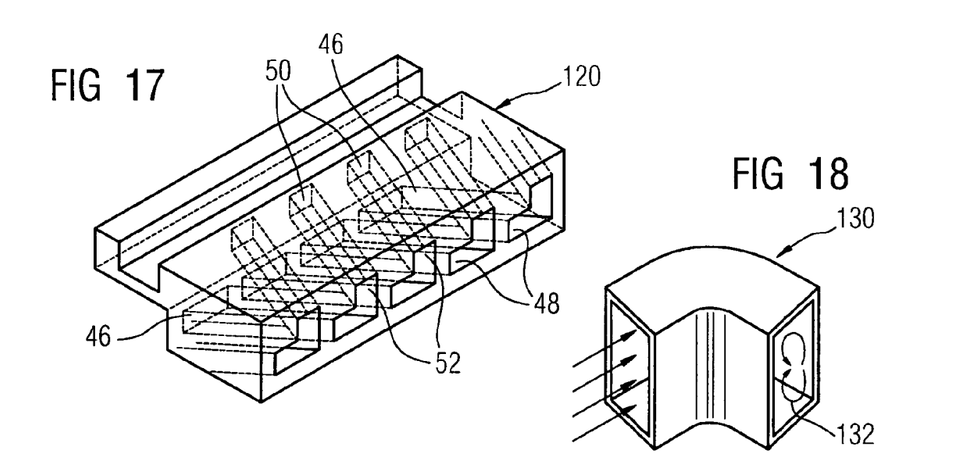
FIG. 17 shows the insert which can be inserted in the region of the trailing edge for producing the crosswise blowing out, in a perspective view.
FIG. 18 shows an insert for producing counter-flowing vortices in the region of the trailing edge of the turbine blade.

A further development of the invention is shown in FIG. 15 to FIG. 17, in which an insert 120, which is essentially solid and rectangular in its dimensions, is inserted into a slot 122 which is provided in the trailing edge 20 of the turbine blade 10 and with which the swirling of the two media M1, M2 which flow out at this point is brought about. The insert 120 which is shown in FIG. 17 in perspective view is equipped with a plurality of first connecting passages 46 which extend parallel to each other and which extend transversely to the second connecting passages 50. First and second connecting passages 46, 50 cross each other without being connected to each other at the crossing points and lead to discharge openings 48, 52 which coincide in pairs, where the mixing of the two media M1, M2 takes place. As a result of the outflow directions of the two media M1, M2 which lie at an angle to each other, said media are efficiently swirled and mixed with each other within a short mixing distance.

Swirl elements in the form of grooves or dimples, which additionally swirl the operating gas 22, can also be provided parallel to the connecting passages 46, 50, which are inclined outwardly and inwardly to the platforms, on the surface of the blade walls 42, 44 which faces the operating gas 22, preferably in the region of the trailing edge 20.

FIG. 18 shows in perspective view a tubular insert 130 which is rectangular in cross section and which on the inside has means for creating kidney-shaped vortices 132. The medium which is introduced into the kidney-shaped vortex flow is mixed especially evenly with the other medium on account of the swirling.

Instead of the subsequent inserting of inserts 90, 100, 120, 130 into a cast blade airfoil 16, and their soldering or welding, these can also be cast in the turbine blade 10 as a component part of a casting core which remains behind in the blade airfoil 16.

A turbine which is equipped with such a turbine blade is suited in a particular way to manipulate the operating medium which flows into it by feeding additional media. For example, the energy content of the operating medium can be increased by means of "in-situ blade reheat", or the emissions loading of the operating medium can be lowered by the addition of additives.

In all, a trailing edge of a turbine blade is proposed by the invention by means of which two media, which are guided separately inside the turbine blade, are added to the operating gas in such a way that these media are first of all mixed with each other before the mixture or one of the media reacts only partially with the operating gas. In order to achieve particularly efficient mixing of the two media within a short mixing distance, means are provided for swirling or eddying the flows, as a result of which, in the case of a combustible mixture, an especially low-emissions combustion of the mixture for reheating the operating gas can be achieved in sufficient time before leaving the turbine, on account of an especially short mixing distance and a short mixing time.

The invention claimed is
1. A turbine blade, comprising:
a profiled blade airfoil that is exposed to a circumflow of an operating gas, the blade airfoil comprising:
a leading edge that is exposed to an inflow of the operating gas, and
a trailing edge on which the operating gas flows out, the trailing edge extending along a blade airfoil principal axis from a root region of the blade airfoil to a tip region of the blade airfoil opposite to the root region;
a first discharge opening arranged in a region of the trailing edge for blowing out a first medium into the operating gas;
a first passage system leading to the first discharge opening for guiding the first medium;
a second discharge opening arranged in the region of the trailing edge at least partially with a same height as the first discharge opening along the blade airfoil principal axis for blowing out a second medium; and a second passage system connected to the second discharge opening for guiding the second medium that is fed to the turbine blade separately from the first medium, wherein the first discharge opening and the second discharge opening forms an overlapping pair of openings along the blade airfoil principal axis.

2. The turbine blade as claimed in claim 1, further comprising a plurality of first discharge openings and an associated plurality of second discharge openings.

3. The turbine blade as claimed in claim 2, wherein the first discharge openings and the associated second discharge openings form a plurality of overlapping pairs of openings along the blade airfoil principal axis.

4. The turbine blade as claimed in claim 3, wherein the overlapping pairs of openings follow each other along the trailing edge.

5. The turbine blade as claimed in claim 1, further comprising a device in the region of the trailing edge for mixing the first medium with the second medium directly downstream of the first and the second discharge openings.

6. The turbine blade as claimed in claim 5, wherein a backflow-free mixing of the first medium with the second medium is created by the device and blows out into the operating gas.

7. The turbine blade as claimed in claim 5, wherein the device comprises a connecting passage arranged in the trailing edge of the blade airfoil that imparts an eddy or vortex to the first or the second medium flowing through the connecting passage.

8. The turbine blade as claimed in claim 7, wherein the connecting passage connects the first passage system to the first discharge opening.

9. The turbine blade as claimed in claim 7, wherein the connecting passage connects the second passage system to the second discharge opening.

10. The turbine blade as claimed in claim 5, wherein the device is arranged in the first or the second discharge opening.

11. The turbine blade as claimed in claim 5, wherein the device is arranged on an inner side of a suction-side blade wall of the blade airfoil or on an inner side of a pressure-side blade wall of the blade airfoil.

12. The turbine blade as claimed in claim 5, wherein the device is selected from the group consisting of: a tetrahedron-shaped mixing insert, a dimple, a turbulator, and a pin.

13. The turbine blade as claimed in claim 5, wherein the blade airfoil is casted and the device is fastened in the blade airfoil as a separately produced insert.

14. The turbine blade as claimed in claim 13, wherein the insert is a corrugated plate or a nozzle and is inserted in a hole or a slot.

15. The turbine blade as claimed in claim 14, wherein the first or the second discharge opening is formed by the insert.

16. The turbine blade as claimed in claim 1, further comprising a turbulence element on a hot-gas side on the blade airfoil.

17. A gas turbine with a turbine blade, comprising:
    a profiled blade airfoil that is exposed to a circumflow of an operating gas, the blade airfoil comprising:
        a leading edge that is exposed to an inflow of the operating gas, and
        a trailing edge on which the operating gas flows out, the trailing edge extending along a blade airfoil principal axis from a root region of the blade airfoil to a tip region of the blade airfoil opposite to the root region;
    a first discharge opening arranged in a region of the trailing edge for blowing out a first medium into the operating gas;
    a first passage system leading to the first discharge opening for guiding the first medium;
    a second discharge opening arranged in the region of the trailing edge at least partially with a same height as the first discharge opening along the blade airfoil principal axis for blowing out a second medium; and
    a second passage system connected to the second discharge opening for guiding the second medium that is fed to the turbine blade separately from the first medium,
    wherein the first discharge opening and the second discharge opening forms an overlapping pair of openings along the blade airfoil principal axis.

\* \* \* \* \*